United States Patent [19]

Cricchio

[11] 3,817,986
[45] June 18, 1974

[54] PYRONO-RIFAMYCINS
[75] Inventor: Renato Cricchio, Varese, Italy
[73] Assignee: Gruppo Lepetit S.p.A., Milano, Italy
[22] Filed: Mar. 12, 1973
[21] Appl. No.: 340,591

[30] Foreign Application Priority Data
Mar. 27, 1972 Italy.................................. 22422/72

[52] U.S. Cl............................ 260/239.3 P, 424/244
[51] Int. Cl............................................. C07d 87/54
[58] Field of Search............................. 260/239.3 P Primary Examiner—Henry R. Jiles
Assistant Examiner—Robert T. Bond
Attorney, Agent, or Firm—Theodore Post; C. Kenneth Bjork

[57] ABSTRACT

Fused pyrono derivatives of rifamycins of the formula

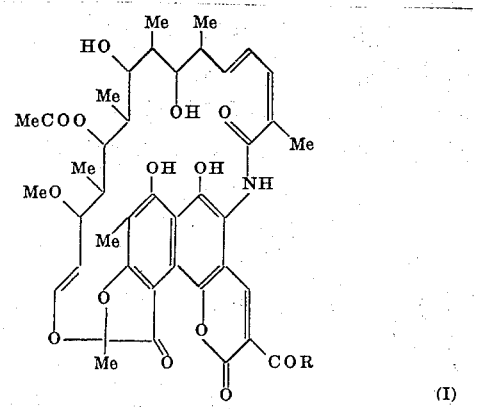

wherein Me is methyl and R is lower alkyl, hydroxy, or lower alkoxy; and the corresponding 25-desacetyl and 16, 17; 18, 19; 28, 29-hexahydro derivatives. The compounds are prepared by reacting 3-formylrifamycin SV or its 25-desacetyl or 16, 17; 18, 19; 28, 29-hexahydro derivative with an equimolar amount of a compound of the formula

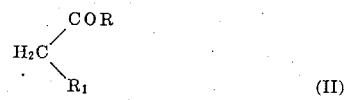

wherein R has the same meaning as above and $R_1$ represents CN, COOH or $COOR_3$ wherein $R_3$ is a straight chain 1 to 4 carbon atom alkyl group. The cyclization reaction is via a condensation of the $-CH_2-$group of a compound of formula (II) with the formyl group in position 3 of the rifamycin with elimination of $H_2O$ followed by a condensation between the $R_1$ group and the OH group in position 4 of the rifamycin system. Depending on the nature of the $R_1$ group, there is an elimination of water, ammonia or a lower alcohol. The novel compounds have antimicrobial activity against gram-positive and gram-negative bacteria.

4 Claims, No Drawings

PYRONO-RIFAMYCINS

SUMMARY OF THE INVENTION

The present invention concerns fused pyrono derivatives of rifamycins represented by the formula

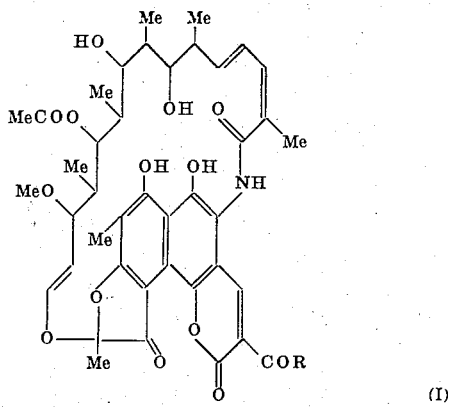

wherein Me represents methyl and R represents lower alkyl, hydroxy, or lower alkoxy; and the corresponding 25-desacetyl and 16, 17; 18, 19; 28, 29-hexahydro derivatives. As used herein, "lower alkyl" and "lower alkoxy" designate straight or branched-chain aliphatic groups of from 1, to 2, to 3, to 4, carbon atoms such as, for instance, methyl, ethyl, propyl, isopropyl, butyl, isobutyl, secondary butyl and tertiary butyl groups, and the corresponding alkoxy groups, respectively.

The compounds are prepared by mixing 3-formylrifamycin SV or its 25-desacetyl or 16, 17; 18, 19; 28, 29-hexahydro derivative with a substantially equimolecular amount of a compound represented by the formula

wherein R has the meaning as given above or is lower alkoxy amino and $R_1$ represents CN, COOH or $COOR_3$ wherein $R_3$ is a straight chain 1 to 4 carbon atom alkyl group. The cyclization reaction is via a condensation of the $-CH_2$-group of a compound of formula (II) with the formyl group in position 3 of the rifamycin with elimination of water of condensation followed by a condensation between the $R_1$ group and the OH group in position 4 of the rifamycin system. Depending on the nature of the $R_1$ group, there is an elimination of water, ammonia or a lower alcohol.

The reaction conditions are those usually employed in the coumarin synthesis with an aromatic o-hydroxyaldehyde as the starting material and which are defined as the Knoevenagel reaction (Org. Reactions, Vol. 15, 204). A conventional basic catalyst is used, i.e., ammonia or an amine such as, for instance, piperidine, pyridine or diethylamine. Other useful catalysts are, for example, ammonium or alkali metal salts such as, for instance, ammonium, potassium or sodium acetate. When the compound of formula (II) is particularly reactive, the reaction may be carried out in the absence of a catalyst. The organic solvents commonly used as reaction media are selected from the lower alkanols, benzene, tetrahydrofuran, chloroform and, when ammonium acetate or alkali metal salts are employed as catalyst, acetic acid. The reaction temperature may be between about 0°C. and the boiling temperature of the solvent depending on the reaction rate of the compound of formula (II).

The novel compounds are colored solids which may be crystallized from common organic solvents such as, for instance, acetone, lower alkanols, ethyl acetate or tetrahydrofuran. They are resistant to oxidation. Their solubility in the organic solvents depends, obviously, on the type and volume of the -COR substituent. When an acid function is present, the compounds as their alkali metal salts are also soluble in water.

The novel compounds have antimicrobial activity against gram-positive and gram-negative bacteria. The compounds have low toxicity toward warm-blooded animals. Representative experiments showed that concentrations of the compounds of following Examples 1 and 2 ranging from 0.1 to 5 γ/ml. inhibit the growth of S. hemolyticus, S. aureus, D. pneumoniae and M. tuberculosis $H_{37}Rv$. Also, at low concentrations the compounds inhibit the growth of microorganisms which are resistant to other known and widely used antibiotics.

Another very important property of the inventive compounds is their inhibiting activity against DNA-polymerases which are characteristic of human leukemic blood lymphoblasts and against typical nucleotidyl transferases (polymerases) of viruses not utilized by the normal cell. It is known from studies on representative members of virus groups that they either carry or induce in the host cells polymerases as an essential part of their replication. Thus, there are viruses such as picornaviruses or polioviruses which induce RNA-dependent RNA-polymerase while other groups such as leukemia-sarcoma viruses carry an RNA-dependent DNA-polymeras. The presence and the very important role of the RNA-dependent DNA-polymerase reverse transcriptase in organic RNA viruses has been discovered by D. Baltimore, Nature, 226, 1209, (1970) and by H. M. Temin et al., Nature, 226, 1211 (1970).

Recent discovery of RNA-dependent DNA-polymerase enzyme in RNA tumor viruses of animal species has been confirmed also by other authors, as follows: Green et al.,: Mechanism of carcinogenesis by RNA tumor viruses. An RNA-dependent DNA-polymerase in murine sarcoma viruses. Proc. Nat. Acad. Sci. USA 67, 385–393, 1970; Spiegelman et al.,: Characterization of the products of RNA direct DNA-polymerases in oncogenic RNA viruses, Nature, London, 227, 563, 1970; Hatanaka et al.,: DNA-polymerase activity associated with RNA tumor viruses. Proc. Nat. Acad. Sci. USA, 67, 143, 1970. Scolnick et al.,: DNA synthesis by RNA containing tumor viruses. Proc. Nat. Acad. Sci: USA, 67, 1034, 1970. RNA virus implication in some tumors has been supported also by other facts: reverse transcriptase has been found to be present in particles from human milk obtained from women with a familiar history of breast cancer and from imbred population. (Scholn et al. Nature, 231, 97, 1971). Priori et al. (Nature New Biology, 232, 16, 1971) isolated a virus named ESP-1 containing reverse transcriptase from cells from the pleural fluid of a child with lymphoma and have succesfully grown it in tissue cultures.

The presence in human breast cancer of RNA homologous to mouse mammary tumor virus RNA has been demonstrated through molecular hybridation experiments by R. Axel et al. (Nature, 235, 32, 1972). The possibility of a human breast cancer virus was also supported by electron microscopy of human milk (N. H. Sarkar et al., Nature, 236, 103, 1972). RNA-directed DNA-polymerase activity and virus like particles have been isolated also from human rhabdomyosarcoma cells (McAllister et al., Nature, New Biol., 235, 3, 1972). At present there are no very effective drugs for treating viral diseases since viruses and cells have common metabolic requirements and pathways. The most promising approach to viral chemotherapy clearly is the design of suitable chemicals which combine specifically with viral- or virus-transformed cell polymerases but not with host cell polymerases controlling the expression of genetic information of viruses. Specific inhibitors of the viral- or virus-transformed cell enzymes and, in particular, inhibitors of polymerases of RNA tumor viruses may have an important role in providing drugs for leukemia and other cancer therapy. The inhibiting activity of the inventive compounds has been tested on RNA-dependent DNA-polymerase of murine sarcoma virus (endogenous) and DNA-dependent DNA-polymerase activity of purified enzymes (poly d A-Tas template). The inhibition was tested according to the methods described by C. Gurgo et al., Nature, New Biology, 229, 111, 1971. The effect of different concentrations of drugs on polymerase activity was determined by following $H^3dTTP$ (tritiated thymine deoxyriboside triphosphate) incorporation into the insoluble fraction. A typical example of the experimental procedures is the following:

1. Isolation of virus and purification of viral polymerase

Virus from murine sarcoma virus (Moloney isolate) transformed rat cells and murine sarcoma virus (Harvey isolate) transformed mouse cells is isolated and purified as previously described (Green et al. Proc, Nat. USA, 67, 385–393, 1970; Rokutanda et al. Nature, 227, 1026–1028, 1970). The virion polymerase is purified 20–40 fold by incubation of purified virus with 0.5 percent NP-40 (nonidet P-40) in 0.1 M NaCl, 0.01 M Tris buffer (pH 7.6), 0.001 M EDTA for 5 minutes at room temperature and zonal centrifugation in 15–30 percent sucrose gradients in 10 mM sodium phosphate buffer (pH 7.4), 2.5 mM $MgCl_2$, 10 mM dithiothreitol, and 5 percent glycerol for 24 hours at 38,000 rpm in a Spinco rotor SW 41. The fractions of the highest enzymatic activity (13–17) of twenty-two fractions collected are pooled and stored at $-70°C$. in 30 percent glycerol.

DNA polymerase assay

Enzyme incubation is performed for one hour at 37°C. in 100 $\mu l$ of reaction mixture containing 40 mM Iris buffer (pH 8.0), 5 mM dithiothreitol, 30 mM NaCl, 2.5 mM $MgCl_2$, 0.1 mM dATP, dGTP, dCTP, and 10 $\mu Ci$ of $^3H$-dTTP (12–18 Ci/mmole) as described by Green et al., in Proc. Nat. Acad. Sci. USA 67, 385–393, 1970. The reaction is terminated by the addition of 150 $\mu l$ of 1N perchloric acid. Calf thymus DNA (100 $\mu g$) is added as carrier; the radioactive DNA product is processed as described in the two papers mentioned above. Endogenous RNA-dependent DNA-polymerase activity is measured after the addition of 0.01 percent NP-40 to purified virus at the time of assay. The DNA-polymerase activity of purified viral polymerase is measured with 2 $\mu g$ of poly d(A-T) as template and no-NP-40.

Test for inhibition by pyrono-rifamycin derivatives

The pyrono-rifamycin derivatives are dissolved in dimethylsulfoxide (DMSO) at a concentration of 5 mg/ml and stored at 4°C. Inhibition of the endogenous RNA-dependent DNA-polymerase activity is tested by adding 2 $\mu l$ of derivative appropriately diluted in DMSO or 2 $\mu l$ of DMSO (control) to the assay mixture prior to addition to disrupted virus which contains 15 to 30 $\mu g$ of viral protein. Enzyme incubation is perfomed for 60 minutes at 37°C. Inhibition of purified enzyme is tested by pre-incubation of 2 $\mu l$ of derivative or DMSO with 30 $\mu l$ of enzyme (1 to 2 $\mu g$ of protein) for 10 minutes at 37°C.; then 70 $\mu l$ of substrate mixture is added and the mixture further incubated and processed as described above.

In representative tests, the inventive compounds at a concentration of 2–100 $\mu g/ml$ or less reduced the incorporation of $H^3$-dTTP to less than 10 per cent of that found in the control tests, clearly demonstrating inhibition of mechanism of carcinogenesis by RNA tumor viruses, according to the most recent biochemical points of view.

The inhibiting effect of reverse transcriptases has been confirmed also by tests on polymerase from murine leukemia virus. Murine leukemia virus RNA-dependent DNA-polymerase is prepared from Triton X 100 disrupted virions as described by Gallo et al. in Nature, New Biology, 232, 141, (1971). Viruses of both Rauscher and Moloney types are previously purified by banding in the 1.16 g/ml region of a sucrose density gradient after initial low speed centrifugation to remove cellular debris and cushioning on 60 percent sucrose through 20 percent sucrose. Final concentration of virus preparation is $10^{11}$ particles/ml. As template, endogenous 70S RNA is used. Concentrations of 50 $\mu g/ml$ or less are found to be effective in inhibiting the enzyme. Similar results are found by using tumor cell polymerases of human origin. In this case the inhibiting activity is studied also on normal cell polymerases to characterize a selective effect.

Representative pyrono-rifamycin derivatives of formula (I) have been evaluated for their effects on two purified DNA-polymerases isolated from (1) human normal (PHA-stimulated) blood lymphocytes; (2) a lymphoblast cell line (derived from a normal donor); and (3) human leukemic blood lymphoblast. Synthetic and/or native templates were used.

A typical example of the experimental procedure is the following:

Human Blood Lymphoblasts

Leukemic lymphoblasts are isolated from the peripheral blood of patients with acute lymphocytic leukemia (ALL) by leukophoresis. The cells are washed and erythrocytes removed by hypotonic lysis.

Normal lymphocytes are obtained from the peripheral blood from healthy donors after removal of granulocytes by nylon column chromatography. They are stimulated with phytohemagglutinin (PHA) for 72 hours as described before (Gallo et al., Nature, 228, 927, 1970; Gallo et al., Science, 165, 400, 1968) in order to maximize DNA-polymerase activity. However, because of the logistics problems in obtaining sufficient amounts of these cells, a human "normal" tissue culture cell line (1788) is used to supply less purified DNA-polymerases for some of the initial survey studies. Compounds of interest are then studied in more detail with the more purified enzymes from the normal and leukemic blood lymphocytes. These tissue culture cells are obtained from Associated Biomedic Systems, Inc.

DNA Polymerase Preparations

Cellular DNA polymerases from normal blood (PHA stimulated lymphocytes, and leukemic blood lymphocytes and (1788) lymphoid cells are extracted and purified by homogenization in hypotonic buffer followed by Triton X 100 and/or high salt extraction of the extralysosomal pellet. After differential centrifugation, cellular extracts are further purified by DEAE cellulose, phosphocellulose, and Sephadex G200 column chromatography.

DNA Polymerase Assays

DNA polymerase assays are carried out in a final volume of 100 $\mu$l. The assay mixture contains Tris-HCl buffer, pH 8.3, 50 mM; MgAc 6.0 mM; dithiothreitol, 8.0 mM; NaCl, 6.0 mM. Adjustment of pH is carried out after addition of inhibitors which are previously dissolved in DMSO. The final concentration of DMSO is 0.5 percent and all control samples include this amount of DMSO. An enzyme concentration that catalyzes an incorporation of approximately 1.0 pmole/hr is used in the assay. The enzyme is in most cases preincubated for 5 minutes with the inhibitor. The reaction is then initiated by the addition of template, either synthetic DNA (poly d(AT) Miles Lab.) and DNA-RNA hybrid (oligo dT.poly rA), at 5 $\mu$g/ml, or native templates: activated salmon sperm DNA at 50 $\mu$g/ml, endogenous 70S viral RNA; 10 $\mu$Ci of ($^3$H-methyl) (New England Nuclear, 18.6 mCi/$\mu$mole, lyophilized and redissolved in 0.01 M HCl just prior to usage) and dATP ($8 \times 10^{-5}$M, with synthetic template) or all three deoxynucleoside triphosphates ($8 \times 10^{-5}$M, with RNA or DNA templated reactions). In some experiments, there is no preincubation of enzyme with inhibitor. In these cases reactions are initiated by adding enzyme to the complete reaction mixture which includes the inhibitor. Samples are withdrawn at the start of incubation and after 30 minutes and terminated by the addition of 2 ml. of 0.08 M sodium pyrophosphate, and precipitated in 12.5 percent cold trichloroacetic acid (TCA) with yeast RNA (400 $\mu$g) as carrier. The products are collected on a Millipore filter, washed extensively with 5 percent TCA and 1 ml. of DMSO-ethanol-0.1 M NaCl mixture (0.5:70:29.5), dried and counted in 2 ml. of BBS$_3$(Beckman) and 10 ml. of Liquifluor (New England Nuclear) in a Packard liquid scintillation counter. Concentrations varying from 5 to 20 $\mu$g/ml are found to provoke a 50 percent inhibition of leukemic polymerase with a synthetic DNA template. Reaction templated by a synthetic RNA template (poly rA.rU) is even more susceptible. Representative experiments carried out with native template on normal and tumor cell polymerases show a higher susceptibility of the tumor enzymes to the tested compounds. Other biological characteristics displayed by the new rifamycin derivatives include inhibition of focus formation on mouse, rat and human cells by the Moloney and Kirsten strain of murine sarcoma virus; selective inhibition of virus production by already transformed mouse and human cells; detection of revertant cells using the murine sarcoma virus transformed non-producer mouse and rat cell systems. The selective toxicity of the new rifamycins for virus-transformed cells of mouse, rat and human origin when tested for colony forming ability has been confirmed. In studies to determine the effect of the compounds in inhibiting focus formation by Moloney sarcoma virus on BALB/3T3 tissue cultures the following procedure is employed. BALB/3T3 cell culture are grown in 250 ml. plastic flasks in growth medium consisting of Eagle's minimal essential medium with 10 percent fetal bovine serum. Cell counts are made with a Coulter counter after suspending the cells with trypsin-versene and diluting in growth medium. Moloney murine sarcoma virus, as a tumor homogenate, is employed. It is passaged four times in a Swiss-derived high passage mouse embryo cell line and assayed for focus-forming units in BALB/3T3 cells. In conducting the studies, a modification of the method described by Hartley and Rowe, Proc. Nat. Acad. Sci., 55, 780, (1966) is used. In the present work, flasks are seeded with from $1-2 \times 10^6$ cells in 25 ml. of growth medium and incubated at 37°C. for 24 hours. Following the removal of fluids, virus at a predetermined number of focus forming units is introduced into 0.5 ml. of growth medium and allowed to adsorb on the monolayer of cells for 90 minutes at 37°C. Following this adsorption period, a predetermined quantity, usually at a dose rate of from about 5 to 10 $\mu$g/ml of a pyronorifamycin compound (previously dissolved in dimethylsulfoxide at a concentration of 1 mg/ml) and carried in 25 ml. of growth medium, is added and the cultures returned to the incubator. As a control, dimethylsulfoxide alone in the growth medium is added to a separate culture. After three days' incubation, the cultures are fluid-changed and foci of transformed cells counted at day seven. In the same method, vesicular stomatitis virus, New Jersey serotype, is studied. Methods used to grow and assay this virus have been described by Hackett et al., Virology, 31, 114 (1967). These properties indicate that the new compounds possess an effective inhibitory activity on virus-induced tumors in animals.

DESCRIPTION OF SOME PREFERRED EMBODIMENTS

The following examples describe representative specific embodiments and the best mode contemplated by the inventor to enable art skilled persons to carry out the invention.

The nomenclature and the numbering are given in an arbitrary manner, considering the 2-pyrone system fused in position 4, 3 of the 4-deoxyrifamycin SV. The numbers with the primes are referred to the pyronic system while those without the primes are referred to the rifamycin system.

Example 1

3'-Acetyl-2'-pyrono[5',6'-c]-4-desoxyrifamycin SV

To a solution of two mmoles of 3-formylrifamycin SV in 70 ml. of tetrahydrofuran, 1 ml. of piperidine and 2 mmoles of ethyl acetoacetate are added. After boiling the reaction mixture for 30 minutes, the reaction is completed. The reaction mixture is evaporated to dryness, then extracted with ethyl acetate and acidified to pH 2 with mineral acid. The organic phase is extracted with 3 times its volume of water. The aqueous layer is then extracted with ethyl acetate and the organic solution, after drying, is evaporated to dryness. The crude residue is crystallized from acetone; m.p. 175°–183°C., yield 50 percent. The same final compound may be prepared substituting methyl acetoacetate in place of ethyl acetoacetate.

Anal. Calcd. for $C_{42}H_{49}NO_{14}$: C, 63.71; H, 6.24; N, 1.77. Found; C, 60.72; H, 6.32; N, 1.36.

| U.V. Spectrum | λ max 1% E 1 cm. | 525 82.7 | 346 295.1 | 311 233.1 |
|---|---|---|---|---|

Example 2

3'-Carboxy-2'-pyrono[5',6'-c]-4-desoxyrifamycin SV

To a solution of 2 mmoles of 3-formylrifamycin SV in 70 ml. of chloroform, 2 ml. of piperidine and 2 mmoles of malonic acid are added. After refluxing the reaction mixture for 4 hours, the reaction is completed. The reaction mixture is evaporated to dryness and then extracted with ethyl acetate and acidified to pH 2 with mineral acid. The organic phase is extracted with about 3 times its volume of water. The aqueous layer is then extracted with ethyl acetate and the organic solution, after drying, is evaporated to dryness. The crude product is crystallized from acetone; m.p. 191°–202°C., yield 40 percent.

Anal. Calcd. for $C_{41}H_{47}NO_{15}$: C, 62.03: H, 5.97; N, 1.76. Found C, 61.69; H, 5.68; N, 1.41.

| U.V. Spectrum | λ max 1% E 1 cm. | 475 116.7 | 333 328 | 307 269.2 |
|---|---|---|---|---|

Pursuant to procedures analogous to those described in the foregoing examples, pyronic derivatives of rifamycin of the formula (I) wherein COR is $COOCH_3$, $COOC_2H_5$, $COOC_3H_7$, $CO-C_3H_7$ or $CO-CH(CH_3)_2$ are prepared.

What is claimed is:

1. A pyrono-rifamycin represented by the formula

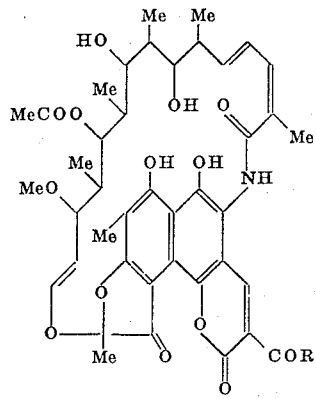

wherein Me represents methyl, R represents lower alkyl, hydroxy or lower alkoxy, and the corresponding 25-desacetyl and 16, 17; 18, 19; 28, 29-hexahydro derivatives.

2. The compound of claim 1 which is 3'-acetyl-2'-pyrono-[5', 6'-c]-4-desoxyrifamycin SV.
3. The compound of claim 1 which is 3'-carboxy-2'-pyrono-[5', 6'-c]-4-desoxyrifamycin SV.
4. A process for preparing a pyrono-rifamycin represented by the formula

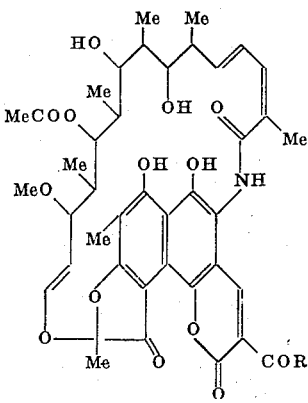

wherein Me represents methyl, R represents lower alkyl, hydroxy or lower alkoxy, and the corresponding 25-desacetyl or 16, 17; 18, 19; 28, 29-hexahydro derivative thereof, which comprises mixing in the presence of an organic solvent 3-formylrifamycin SV or its 25-desacetyl or 16, 17; 18, 19; 28, 29-hexahydro derivative with a substantially equimolar amount of a compound represented by the formula

wherein R represents lower alkyl, hydroxy or lower alkoxy amino and $R_1$ represents a COOH, CN or $COOR_3$ group wherein $R_3$ represents a straight chain 1 to 4 carbon atom alkyl group at a temperature between about zero degrees and reflux temperature and recovering said pyrono-rifamycin product.

* * * * *

PO-1050
(5/69)

UNITED STATES PATENT OFFICE
CERTIFICATE OF CORRECTION

Patent No. 3,817,986      Dated June 18, 1974

Inventor(s) Renato Cricchio

It is certified that error appears in the above-identified patent and that said Letters Patent are hereby corrected as shown below:

Column 2, line 31, correct spelling of "polymerase";

Column 3, line 51, change "Iris" to -- Tris --;

Column 5, line 31, insert "TTP" after "($^3$H-methyl);

Signed and sealed this 18th day of February 1975.

(SEAL)
Attest:

RUTH C. MASON
Attesting Officer

C. MARSHALL DANN
Commissioner of Patents
and Trademarks